UNITED STATES PATENT OFFICE.

HARRY C. WOOD, OF CINCINNATI, OHIO.

COUPON-BOOK.

1,110,367. Specification of Letters Patent. Patented Sept. 15, 1914.

Application filed September 5, 1911. Serial No. 647,757.

*To all whom it may concern:*

Be it known that I, HARRY C. WOOD, a citizen of the United States, residing at Cincinnati, in the county of Hamilton and State of Ohio, have invented certain new and useful Improvements in Coupon-Books, of which the following is a specification.

My invention relates to an improvement in coupon book, and primarily in providing a leaf thereof as a combined certificate of obligation and premium or discount coupon.

The object of my invention is to provide a coupon book with one leaf thereof forming a certificate of obligation or record slip when detached from the book, and when separated into coupons utilized as premium or discount tickets.

Another object of my invention is to provide a certificate of obligation with its reverse side divided into coupons denominate of a discount or premium value when used separately and with the certificate arranged to permit the same to be readily separated intermediate of the coupons on the reverse side.

The features of my invention will be more fully set forth in the description of the accompanying drawings, forming a part of this specification, in which:—

Figure 1:
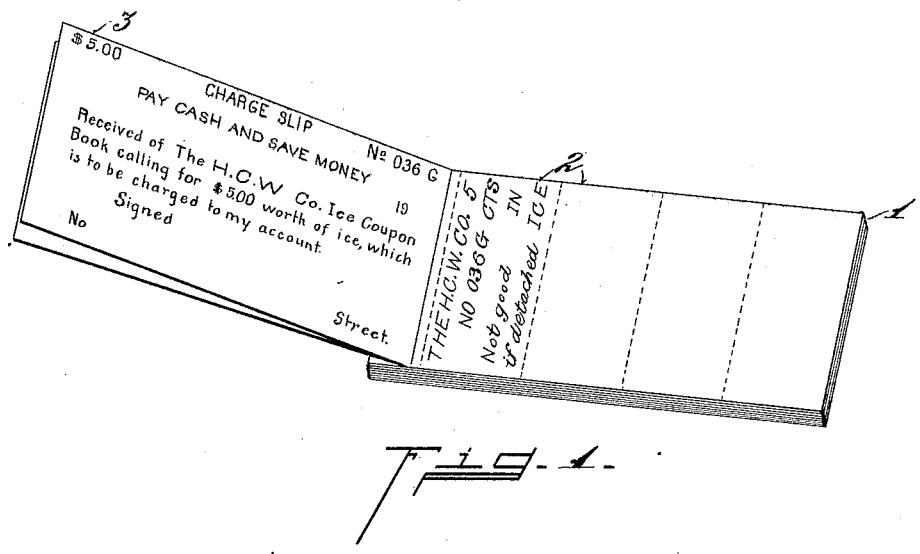
Figure 2:
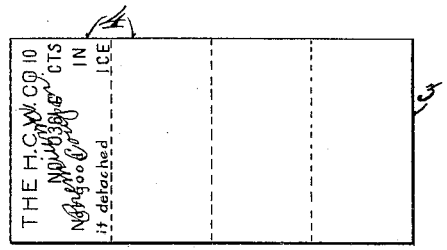

Figure 1 is a perspective view of a coupon book showing the same open to display the leaf forming a certificate of obligation and capable of being readily detached from the book. Fig. 2 is a detailed view of the reverse side of the leaf forming the certificate of obligation divided into a series of coupons.

The coupon book in which my invention is applied is primarily of that type in which the coupons are redeemable in merchandise as is commonly employed by retail ice dealers whereby a coupon is given in lieu of cash at the time of purchase and where the daily sales are usually in small amounts, thereby avoiding the inconvenience and loss occasioned by paying cash. These coupon books are sold for cash or charged to the account of the customer, and under the old methods now commonly employed, an employee of the merchant could easily defraud his employer.

Further, my improvement encourages a customer to make his transactions on a cash basis in preference to credit. In this I provide a leaf of the book arranged to be readily detachable therefrom, with one side thereof designated as a certificate or instrument of obligation and in the form illustrated, is utilized as a charge slip, setting forth that the coupon book was received by the customer and that he desires the cost thereof charged to his account. This is signed by the customer and detached from the book and held by the merchant, or serves as a record or receipt between the customer and employee when the book is sold by the employee, in which instance, the employee of the merchant is accountable in cash, or the return of the certificate of obligation for each book placed in his charge.

The certificate of obligation when allowed to remain in the hands of the purchaser or customer, loses its identity as such and can be separated into coupons redeemable in merchandise and represent premium or discount values on the cash purchase price of the book.

In the drawings, 1 represents the book, in which the leaves are in the form of a series of coupons 2 readily detachable from each other and from the book, each coupon 2 thereof having a fixed value, and redeemable in merchandise. 3 represents the leaf comprising the combined certificate of obligation and coupon slip adapted to be detached from the book as a whole or separated into individual coupons as indicated on the reverse side of the leaf or slip. These coupons 4 serve as premium or discount checks redeemable in merchandise when in the possession of the customer, and show that the customer has paid cash for the book and the coupons represent a value equal to the discount allowed upon the cost of the book. This encourages the customer to pay cash for the book and receive the premium or discount coupons, it is also a material saving in bookkeeping, enabling the sale of the book to be entered as a cash transaction, and a material safeguard against anyone practising dishonest methods.

The book, coupons 2 and 4 and the face of the certificate of obligation bear like identifying means in the nature of a character or numeral for record purposes.

Having described my invention, I claim:—

1. A coupon book, comprising leaves each divided into separable coupons of a redeemable value, and a leaf having one side representing a certificate of obligation, the reverse side divided into a series of coupons, said leaf unitarily detachable from the book for certificate use, and serially separable for coupon use.

2. A coupon book, comprising leaves each divided into separable coupons of a redeemable value, and a leaf having one side representing a certificate of obligation, the reverse side divided into a series of coupons, said leaf unitarily detachable from the book for certificate use, and serially separable for coupon use, with all coupons and face of the certificate of obligation bearing like identifying means.

3. A book, having a leaf with one of its sides representing a certificate of obligation, unitarily detachable from the book on a credit purchase of the book, and serially separable for coupon use of redeemable discount value on a cash purchase of the book.

4. A book having a detachable leaf, one side sub-divided into coupons and separable from each other, the opposite side of the leaf representing an instrument of obligation for the purchase value of the book on a credit transaction and the coupons discount values thereof and redeemable by the purchase of the book on a cash transaction, and the book, coupons and face of the instrument of obligation bearing like identifying means.

In testimony whereof, I have hereunto set my hand.

HARRY C. WOOD.

Witnesses:
OLIVER B. KAISER,
EMMA SPENER.

Copies of this patent may be obtained for five cents each, by addressing the "Commissioner of Patents, Washington, D. C."